United States Patent
Lin

(10) Patent No.: US 10,365,862 B2
(45) Date of Patent: Jul. 30, 2019

(54) SYSTEM, INFORMATION PROCESSING APPARATUS, INFORMATION PROCESSING METHOD, AND PROGRAM FOR PERFORMING A PROCESS OF TRANSMITTING PAGE DESCRIPTION LANGUAGE DATA TO AN IMAGE FORMING APPARATUS

(71) Applicant: CANON KABUSHIKI KAISHA, Tokyo (JP)

(72) Inventor: Zhi Lin, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/492,883

(22) Filed: Apr. 20, 2017

(65) Prior Publication Data

US 2017/0315759 A1    Nov. 2, 2017

(30) Foreign Application Priority Data

Apr. 28, 2016 (JP) ................................. 2016-091511

(51) Int. Cl.
*G06F 3/12* (2006.01)

(52) U.S. Cl.
CPC ............ *G06F 3/1205* (2013.01); *G06F 3/122* (2013.01); *G06F 3/126* (2013.01); *G06F 3/1221* (2013.01); *G06F 3/1238* (2013.01); *G06F 3/1248* (2013.01); *G06F 3/1268* (2013.01); *G06F 3/1273* (2013.01); *G06F 3/1275* (2013.01); *G06F 3/1288* (2013.01); *Y02D 10/1592* (2018.01)

(58) Field of Classification Search
CPC combination set(s) only.
See application file for complete search history.

(56) References Cited

U.S. PATENT DOCUMENTS

| 2006/0227367 | A1* | 10/2006 | Kitada | ................ G06F 11/2028 358/1.15 |
| 2011/0032571 | A1* | 2/2011 | Kitada | ................ G06F 11/2028 358/1.15 |

(Continued)

FOREIGN PATENT DOCUMENTS

| JP | 2010-211627 A | 9/2010 |
| JP | 2014-148064 A | 8/2014 |

(Continued)

*Primary Examiner* — Barbara D Reinier
(74) *Attorney, Agent, or Firm* — Canon U.S.A., Inc IP Division

(57) ABSTRACT

An image forming system includes a first information processing apparatus, a second information processing apparatus, and an image forming apparatus. The image forming system is capable of performing a process of transmitting PDL data acquired by the first information processing apparatus to the second information processing apparatus and, then, transmitting the PDL data to the image forming apparatus to use the PDL data for image formation and a process of transmitting the PDL data acquired by the first information processing apparatus to the image forming apparatus in response to a request from the image forming apparatus without transmitting the PDL data to the second information processing apparatus to use the PDL data for image formation.

13 Claims, 10 Drawing Sheets

(56) References Cited

U.S. PATENT DOCUMENTS

2016/0080585 A1\* 3/2016 Kobayashi ......... H04N 1/00204
                                                358/1.15
2017/0149985 A1\* 5/2017 Nomura ................ G06F 3/1204

FOREIGN PATENT DOCUMENTS

| JP | 5668622 B2 | 2/2015 |
| JP | 5935368 B2 | 6/2016 |

\* cited by examiner

| JOB NAME | DOCUMENT RECEPTION DEVICE IP ADDRESS | OUTPUT DEVICE IP ADDRESS | JOB OWNER NAME | OTHER SETTING |
|---|---|---|---|---|
| MeetingMaterial.doc | 192.168.5.1 | 192.168.5.2 | Smith | ... |
| Quotation.doc | 192.168.5.2 | 192.168.5.2 | Brown | ... |
| Sample.doc | 192.168.5.2 | 192.5.168.3 | Smith | ... |
| ... | ... | ... | ... | ... |

| JOB NAME |
| --- |
| MeetingMaterial.doc |
| Sample.pdf |
| ... |

SYSTEM, INFORMATION PROCESSING APPARATUS, INFORMATION PROCESSING METHOD, AND PROGRAM FOR PERFORMING A PROCESS OF TRANSMITTING PAGE DESCRIPTION LANGUAGE DATA TO AN IMAGE FORMING APPARATUS

BACKGROUND OF THE INVENTION

Field of the Invention

The aspect of the embodiments relates to an image forming system in which an apparatus used to hold page description language (PDL) data is different from an apparatus used to output an image based on PDL data, and an information processing apparatus, an information processing method, and a program used in the system.

Description of the Related Art

Image forming apparatuses, such as printers, have hitherto formed images on sheets based on print data. Such an image forming apparatus has a function to store print data input from a personal computer (PC) in a storage unit and form an image at a timing specified by a user who has logged in the apparatus. Technologies to download print data from external server apparatuses to use the print data for image formation are also in widespread use in recent years. A printing system using such a server apparatus is capable of printing print data from any image forming apparatus connected to the server apparatus. In addition, in order to reduce concentration of loads on server apparatuses, technologies to distribute pieces of print data among image forming apparatuses without concentrating the print data in the server apparatuses are also proposed (refer to Japanese Patent Laid-Open No. 2010-211627). Unlike the server apparatuses that are operated with constantly being turned on, the image forming apparatuses may be turned off. Accordingly, a printing system disclosed in Japanese Patent Laid-Open No. 2010-211627 has an issue in that the printing system is not capable of printing print data stored in an image forming apparatus that is turned off. It is desirable to provide a printing system capable of resolving such an issue and suppressing reduction in usability, which is caused by loss of printing opportunities.

SUMMARY OF THE INVENTION

The aspect of the embodiments provides an image forming system including a first information processing apparatus, a second information processing apparatus, and an image forming apparatus. The first information processing apparatus acquires PDL data from an external apparatus, generates identification information for the acquired PDL data, transmits the generated identification information to the second information processing apparatus, transmits the PDL data to the second information processing apparatus if the first information processing apparatus determines that the PDL data is to be transmitted to the second information processing apparatus, and transmits the PDL data to the image forming apparatus in response to a request from the image forming apparatus without transmitting the PDL data to the second information processing apparatus. The second information processing apparatus acquires the identification information from the first information processing apparatus, transmits the identification information to the image forming apparatus, and transmits the PDL data to the image forming apparatus in response to a request from the image forming apparatus if the second information processing apparatus determines that the PDL data has been acquired from the first information processing apparatus. The image forming apparatus acquires the identification information from the second information processing apparatus, acquires the PDL data from the first information processing apparatus if the image forming apparatus determines that the PDL data is to be acquired from the first information processing apparatus and forms an image based on the PDL data, and acquires the PDL data from the second information processing apparatus if the image forming apparatus determines that the PDL data is to be acquired from the second information processing apparatus and forms an image based on the PDL data.

Further features of the disclosure will become apparent from the following description of exemplary embodiments with reference to the attached drawings.

BRIEF DESCRIPTION OF THE DRAWINGS

FIG. 8 illustrates an exemplary job history.

FIG. 9 illustrates an exemplary remote print record list.

DESCRIPTION OF THE EMBODIMENTS

Embodiments of the disclosure will herein be described with reference to the drawings.

First Embodiment

Figure 1A:
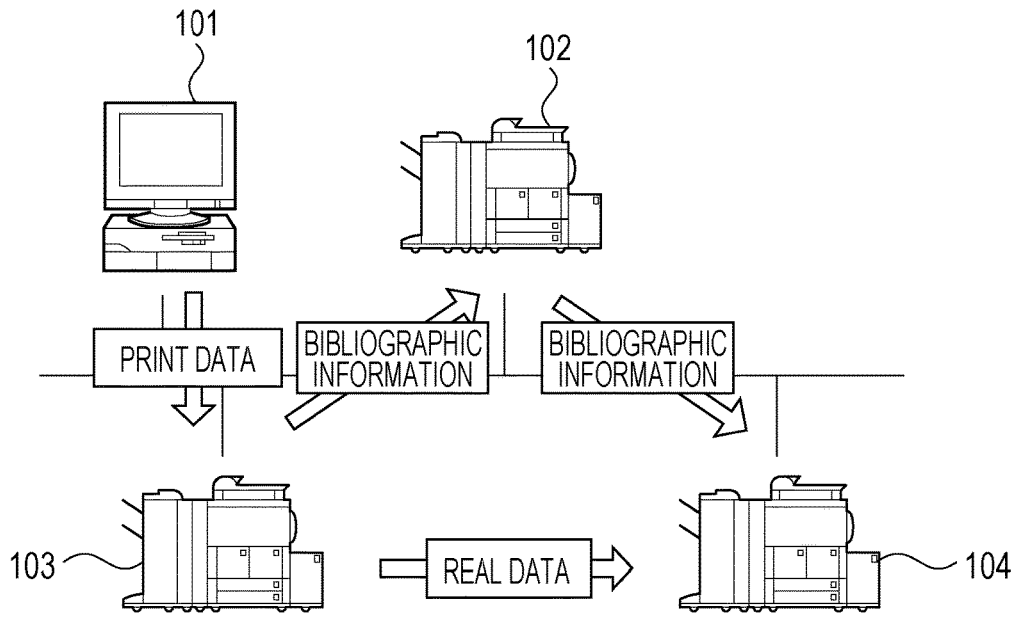
FIGS. 1A and 1B illustrate an exemplary system configuration of a hold printing system.
Figure 1B:
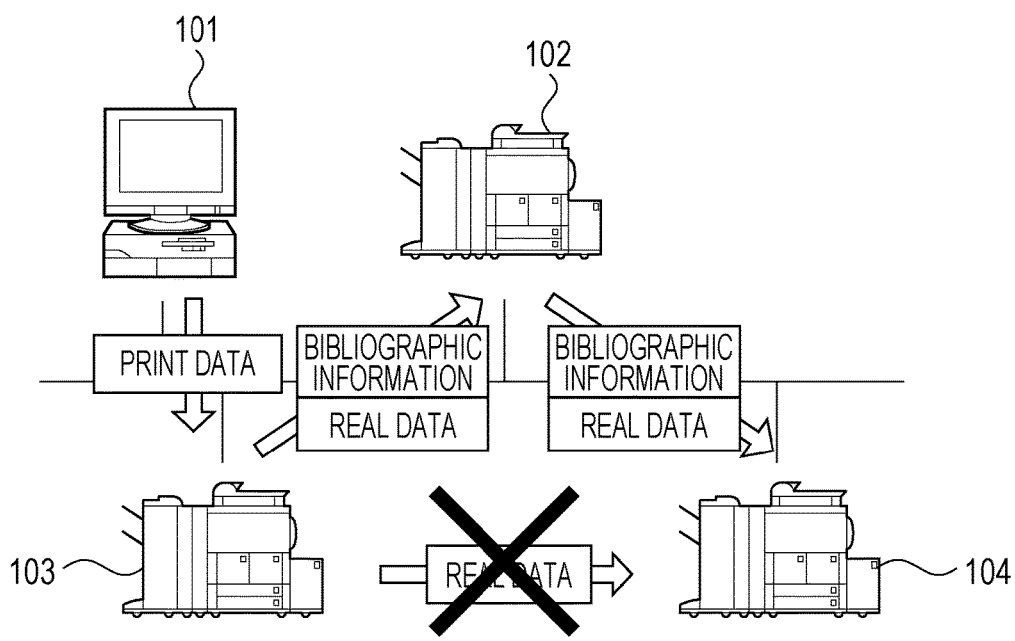

A printing system according to a first embodiment will now be described. FIGS. 1A and 1B illustrate an exemplary system configuration of a hold printing system. The printing system includes an information processing apparatus 101, a server device 102, a document reception device 103, and an output device 104. The information processing apparatus 101, the server device 102, the document reception device 103, and the output device 104 are capable of communicating with each other via a network. Specifically, in the printing system, the server device 102 is an image forming apparatus having a server function and each of the document reception device 103 and the output device 104 is an image forming apparatus having a client function.

FIG. 1A illustrates a first processing flow of the hold printing system. FIG. 1B illustrates a second processing flow of the hold printing system.

In the first processing flow illustrated in FIG. 1A, a hold printing process is performed in the following manner.

First, the information processing apparatus 101 generates a print job (print data) and transmits the generated print job to the document reception device 103. The document reception device 103 stores the print job received from the information processing apparatus 101. In addition, the document reception device 103 generates bibliographic information (identification information) from the print job received from the information processing apparatus 101 and transmits the generated bibliographic information to the server device 102, which is a server machine, to submit a request for registration of the bibliographic information. The server device 102 registers and stores the bibliographic information received from the document reception device 103. In the first processing flow, the document reception device 103 determines that it is not necessary to transmit real data to the server device 102.

Then, the output device 104 submits a request for acquisition of the bibliographic information to the server device 102. Upon reception of the request for acquisition of the bibliographic information from the output device 104, the server device 102 transmits the stored bibliographic information to the output device 104.

Upon selection of the print job to be printed based on the acquired bibliographic information and issuance of a print instruction, the output device 104 submits a request for acquisition of the real data to the document reception device 103, which is a device that stores the real data corresponding to the selected print job, based on the bibliographic information. Upon acquisition of the real data, the output device 104 forms an image based on the real data.

In the second processing flow illustrated in FIG. 1B, the hold printing process is performed in the following manner.

First, the information processing apparatus 101 generates a print job and transmits the generated print job to the document reception device 103. The document reception device 103 stores the print job received from the information processing apparatus 101. In addition, the document reception device 103 generates bibliographic information (identification information) from the print job received from the information processing apparatus 101 and transmits the generated bibliographic information to the server device 102, which is a server machine, to submit a request for registration of the bibliographic information. In the second processing flow, the document reception device 103 determines that it is necessary to transmit the real data to the server device 102. In the first embodiment, upon reception of the request for acquisition of the real data from the server device 102, the document reception device 103 determines that it is necessary to transmit the real data and transmits the real data to the server device 102.

The server device 102 transmits the request for acquisition of the real data to the document reception device 103, for example, in the following case. The server device 102 determines whether it is necessary to submit the request for acquisition of the real data based on the bibliographic information received from the document reception device 103. For example, if the identification information (a flag indicating remote print) indicating the possibility for printing in another image forming apparatus is included in the acquired bibliographic information, the server device 102 determines that it is necessary to submit the request for acquisition of the real data. The server device 102 transmits the request for acquisition of the real data corresponding to the bibliographic information received from the document reception device 103 to the document reception device 103.

Upon acquisition of the real data from the document reception device 103, the server device 102 manages (stores and registers) the acquired real data in association with the bibliographic information.

Then, the output device 104 is operated by a user to submit the request for acquisition of the bibliographic information to the server device 102. Upon reception of the request for acquisition of the bibliographic information from the output device 104, the server device 102 transmits the stored bibliographic information to the output device 104. In the image forming apparatus, an instruction to select and print the print job is issued based on the bibliographic information. Upon issuance of the instruction to print the print job by the user, the output device 104 submits the request for acquisition of the real data corresponding to the selected print job to the server device 102 based on the bibliographic information. Upon reception of the request for acquisition of the real data, the server device 102 transmits the real data to the output device 104. Upon acquisition of the real data, the output device 104 forms an image based on the real data.

As described above, in the case of the print job for which the remote print is to be performed, the real data is registered in advance in the server device 102, in addition to the bibliographic information. This enables the output device 104 to acquire the real data not from the document reception device 103 but from the server device 102. Accordingly, the output device 104 is capable of acquiring the real data even if the document reception device 103 is turned off. In addition, if the document reception device 103 is in a sleep state, it is not necessary to activate the document reception device 103.

Figure 2:
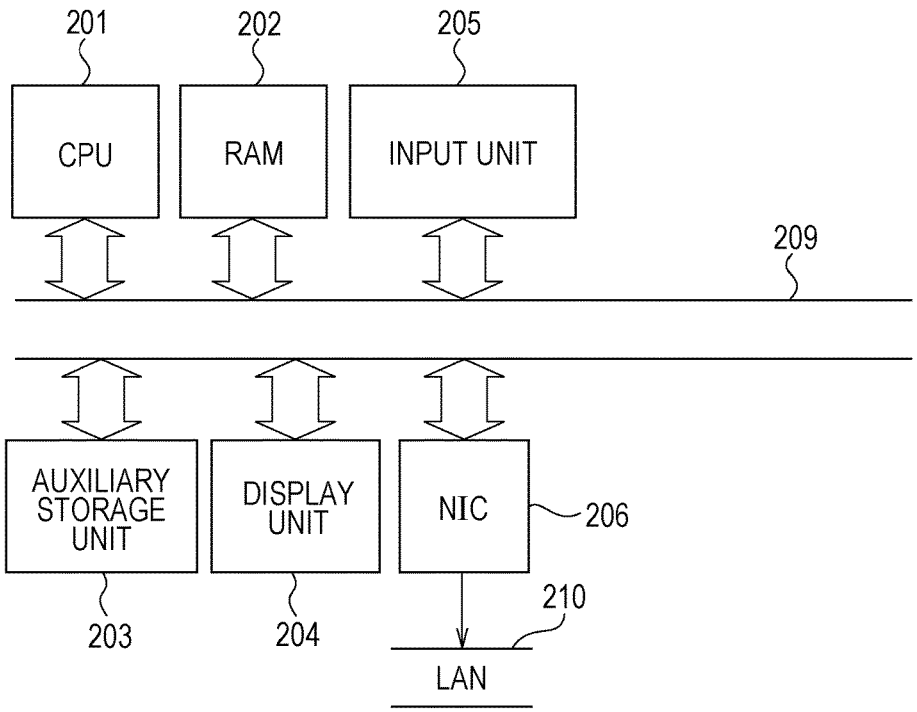
FIG. 2 illustrates an exemplary hardware configuration of an information processing apparatus.

An exemplary hardware configuration of the information processing apparatus 101 will now be described. FIG. 2 illustrates an exemplary hardware configuration of the information processing apparatus 101. Referring to FIG. 2, the information processing apparatus 101 includes a central processing unit (CPU) 201, a random access memory (RAM) 202, an auxiliary storage unit 203, a display unit 204, an input unit 205, and a network interface card (NIC) 206. The CPU 201 is a processor that controls the information processing apparatus 101. The RAM 202 functions as a working area of the CPU 201. The auxiliary storage unit 203 is a storage medium, such as a hard disk drive (HDD), which stores various programs executed by the CPU 201 and a variety of data used in processes performed by the CPU 201. The CPU 201 reads out a program stored in the auxiliary storage unit 203 into the RAM 202 and executes the program to realize a functional configuration of the information processing apparatus 101 illustrated in FIG. 5. In other words, the CPU 201, the RAM 202, and the auxiliary storage unit 203 function as a controller that controls the information processing apparatus 101.

The display unit 204 is a monitor, such as a cathode ray tube (CRT) display or a liquid crystal display, which displays a variety of information (for example, a message) to indicate the information to the user. The input unit 205 is a user interface including a mouse and a keyboard, which accepts an input into the information processing apparatus 101 by the user. The NIC 206 is a communication unit used by the information processing apparatus 101 to exchange data with another network device via a local area network (LAN) 210. The above components are connected to each other via a main bus 209 so as to be communicable with each other.

Figure 3:
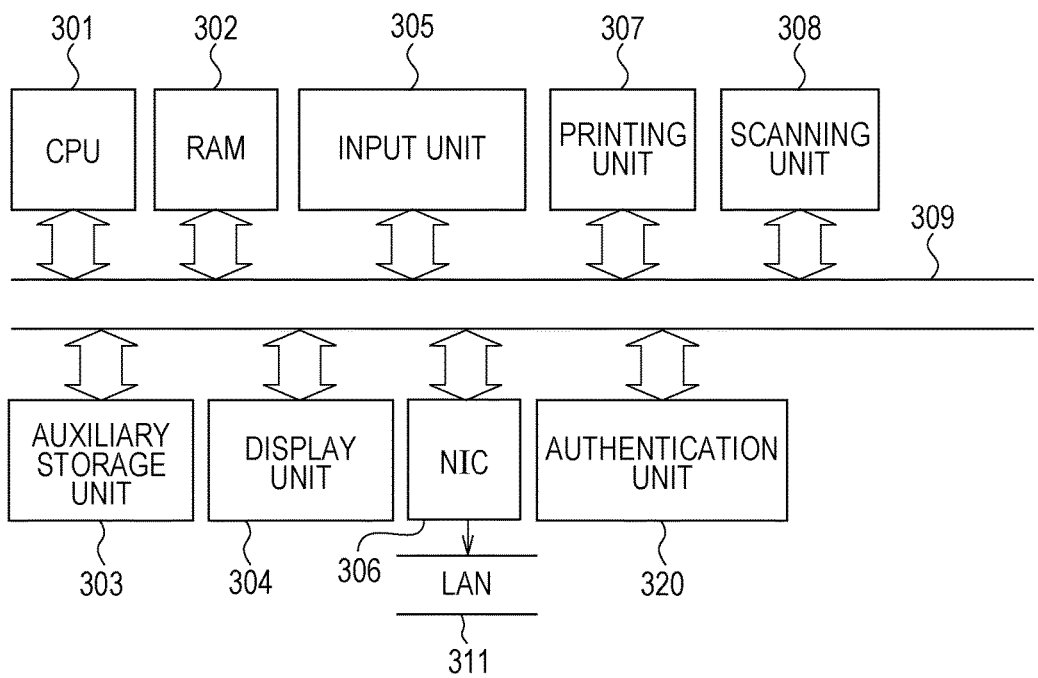
FIG. 3 illustrates an exemplary hardware configuration of an image forming apparatus.

An exemplary hardware configuration of the server device 102, the document reception device 103, and the output device 104 will now be described. The image forming apparatuses have the same hardware configuration. Accordingly, the hardware configuration of the server device 102 is exemplified and a description of the hardware configurations of the document reception device 103 and the output device 104 is omitted herein. FIG. 3 illustrates an exemplary hardware configuration of the server device 102. Referring to FIG. 3, the server device 102 includes a CPU 301, a RAM 302, an auxiliary storage unit 303, a display unit 304, an input unit 305, an NIC 306, a printing unit 307, a scanning unit 308, and an authentication unit 320.

The CPU 301 is a processor that controls the server device 102. The RAM 302 is a storage unit, such a memory, which functions as a working area of the CPU 301. The auxiliary storage unit 303 is a storage unit, such as a hard disk drive (HDD), which stores various programs executed by the CPU 301 and a variety of data used in processes performed by the CPU 301. The auxiliary storage unit 303 may temporarily store data and may be used, instead of the RAM 302. The CPU 301 reads out a program stored in the auxiliary storage unit 303 into the RAM 302 and executes the program to realize a functional configuration of the server device 102 illustrated in FIG. 6 and a process in a flowchart. In other words, the CPU 301, the RAM 302, and the auxiliary storage unit 303 function as a controller (control unit) that controls the server device 102.

The display unit 304 is, for example, a liquid crystal display that displays the state of the server device 102, an error message, and so on. The input unit 305 is an input interface, such as a touch panel or a keyboard, which accepts an input concerning specification of a print job from the user. The NIC 306 is a communication unit used by the server device 102 to exchange data with another network device via a LAN 311.

The printing unit 307 is an image forming unit, such as a print engine, which performs printing (forms an image) on a sheet based on image data. The printing unit 307 is capable of identifying the states of a paper feed option (for example, a paper feed cassette) and a discharge option (for example, a finisher unit), which relate to the printing process. The scanning unit (scanner) 308 scans a paper document placed on a platen glass to generate, for example, black-and-white binary image data (real data) or color multi-value image data (real data). The printing unit 307 is capable of printing the image data scanned by the scanning unit 308. This is referred to as copy printing. In addition, the printing unit 307 is capable of holding the image data in the auxiliary storage unit 303 to print the image data at arbitrary timing. This is referred to as hold printing. The authentication unit 320 performs authentication of the user. The authentication unit 320 is, for example, a card authentication unit that reads out authentication information from an integrated circuit (IC) card held over the authentication unit 320 by the user to authenticate the user. The authentication unit 320 is, for example, a keyboard authentication unit that authenticates the user based on input information input with the input unit 305. The server device 102 is capable of permitting or limiting use of each function of the server device 102 by the user with the authentication unit 320. The above components are connected to each other via a main bus 309 so as to be communicable with each other.

Figure 4:
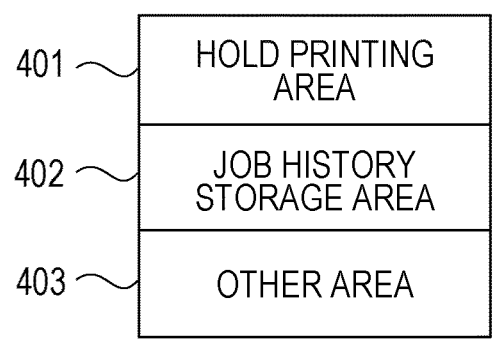
FIG. 4 is a conceptual diagram indicating exemplary division of areas in an auxiliary storage unit.

Division of areas in the auxiliary storage unit will now be described. FIG. 4 is a conceptual diagram indicating exemplary division of areas in the auxiliary storage unit 303. In the first embodiment, the auxiliary storage unit 303 includes a hold printing area 401, a job history storage area 402, and another area 403.

The hold printing area 401 is an area for storing the print job (the bibliographic information and the real data). The job history storage area 402 is an area for storing history information about the print job. The other area 403 is an area other than the above areas. A copy job or a scanner job from the scanning unit 308 is temporarily stored in the other area 403 and number-of-prints information and so on corresponding to charge are stored in the other area 403.

Figure 5:
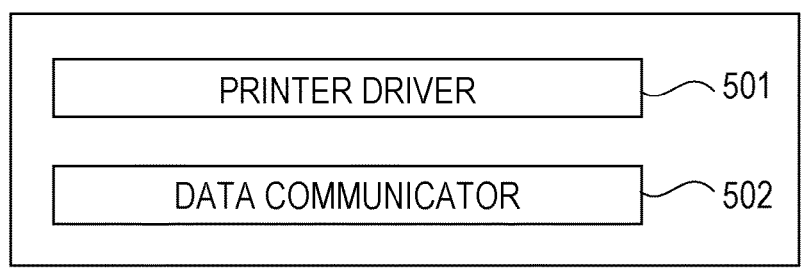
FIG. 5 illustrates an exemplary functional configuration of the information processing apparatus.

A functional configuration of the information processing apparatus will now be described. FIG. 5 illustrates an exemplary functional configuration of the information processing apparatus 101.

Referring to FIG. 5, a printer driver 501 generates a print job in response to an instruction from an arbitrary application, such as a text editor. A data communicator 502 inputs the print job generated by the printer driver 501 into the server device 102 and receives the result processing of the print job that is input from the server device 102. Although the data communicator 502 uses the NIC 206 in communication with the server device 102, the data communicator 502 may use an interface, such as a universal serial bus (USB), for communication.

Figure 6:
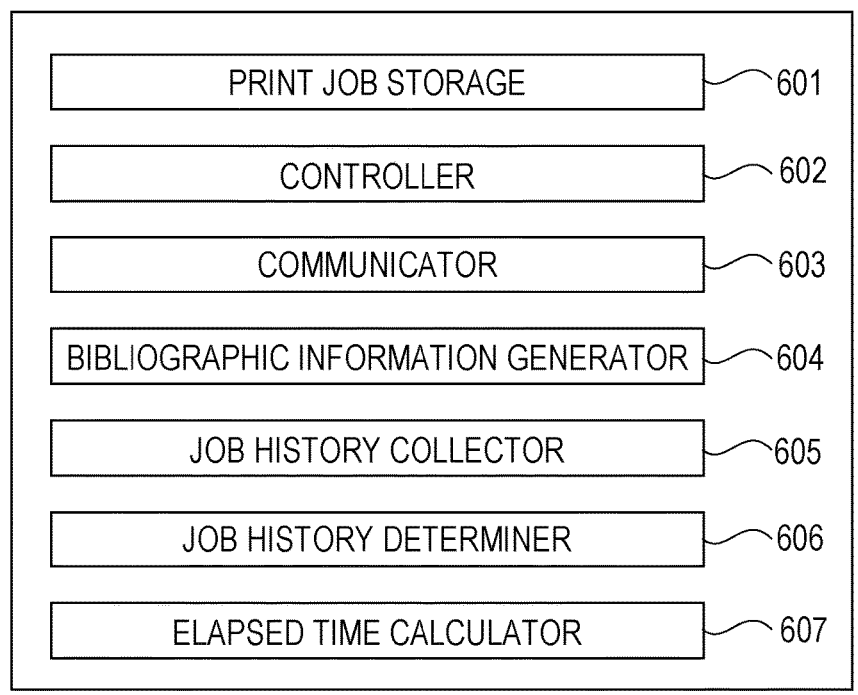
FIG. 6 illustrates an exemplary functional configuration of the image forming apparatus.

A functional configuration of the image forming apparatus will now be described. FIG. 6 illustrates an exemplary functional configuration of the image forming apparatuses 102 to 104.

Referring to FIG. 6, a print job storage 601 is a functional unit that controls a process of storing the print job. The print job storage 601 in the document reception device 103 stores print job 700 in FIG. 7, which is input from the information processing apparatus 101, in the hold printing area 401. The print job storage 601 stores bibliographic information 701 and real data 702 in FIG. 7, which are input from other image forming apparatuses, in the hold printing area 401.

A controller 602 is a functional unit that controls each functional unit. The controller 602 receives the print job 700 input from the information processing apparatus 101.

The controller 602 in the server device 102 receives and manages the bibliographic information 701 and the real data 702 transmitted from the document reception device 103. The controller 602 in the server device 102 may be configured so that the bibliographic information 701 and the real data 702 are deleted after a predetermined time. In addition, the controller 602 in the server device 102 determines whether it is necessary to transfer the print job input into the document reception device 103 to the server device 102. For example, when a job name 711 is a specific job name, the controller 602 in the server device 102 returns a result "transfer is needed" to a communicator 603. The specific job name is a job name specified by a job history determiner 606 as a job name having a past record of the remote print.

The controller 602 in the server device 102 outputs the determination result "transfer is needed". When the result "transfer is needed" is output, the server device 102 submits a request for acquisition of the real data 702 to the document reception device 103 to acquire the real data.

In other words, the document reception device 103 receives the request for acquisition of the real data 702 from the server device 102 and transmits the real data 702 to the server device 102.

Upon input of the print job into the document reception device 103, the communicator 603 in the document reception device 103 transmits the bibliographic information 701 about the print job input into the server device 102. In addition, upon reception of the request for acquisition of the real data 702 from the server device 102, the communicator 603 in the document reception device 103 transmits the real data to the server device 102. Furthermore, upon reception of the request for acquisition of the real data 702 from the output device 104, the communicator 603 in the document reception device 103 transmits the real data to the output device 104.

The communicator 603 in the server device 102 submits the request for acquisition of the real data 702 to the document reception device 103 and receives the real data 702 from the document reception device 103. Upon reception of the real data 702 from the document reception device 103, the communicator 603 in the server device 102 requests the processing of the print job storage 601. The print job storage 601 stores the real data 702 in the hold printing area 401. Upon reception of the request for acquisition of the bibliographic information 701 from the output device 104, the communicator 603 in the server device 102 transmits the bibliographic information 701 to the output device 104. The request for acquisition of the real data may be received from the output device 104 for a job for which the real data is managed in the server device 102 in a job list included in the bibliographic information. In this case, upon reception of the request for acquisition of the real data from the output device 104, the server device 102 transmits the real data to the output device 104.

A bibliographic information generator 604 is a functional unit that generates the identification information (bibliographic information) about the print job based on the print job. Upon input of the print job from the information processing apparatus 101 to the document reception device 103, the bibliographic information generator 604 in the document reception device 103 generates the bibliographic information 701 from the acquired print job. A job history collector 605 is a functional unit that stores and manages a history of print jobs that have been performed.

The job history collector 605 is mainly used in the server device 102.

The job history collector 605 in the server device 102 acquires a job history table 800 in FIG. 8 from a client machine (the document reception device 103 or the output device 104) via the communicator 603. The job history collector 605 stores the result of collection in the job history storage area 402.

The job history determiner 606 is a functional unit that determines coincidence in address between the document reception device 103 of the print job and the output device 104 of the print job. The job history determiner 606 focuses on one job in the job history table 800 collected by the job history collector 605 and acquires a document reception device IP address 712 and an output device IP address 713 of the print job on which the job history determiner 606 focuses. If the document reception device IP address 712 of the print job on which the job history determiner 606 focuses is different from the output device IP address 713 thereof, the job history determiner 606 determines that the print job is subjected to the remote print. The job history determiner 606 extracts the job name 711 of the print job subjected to the remote print and stores the job name 711 in a remote print record list 1000 in FIG. 9. In other words, the print job the job name 711 of which is stored in the remote print record list 1000 has been subjected to the remote print.

An elapsed time calculator 607 is a functional unit that counts a time period in which the real data 702 is stored.

The elapsed time calculator 607 is mainly used in the server device 102. Upon acquisition of the real data 702 from the document reception device 103 and storage of the acquired real data 702 in the hold printing area 401 by the server device 102, the elapsed time calculator 607 in the server device 102 counts the elapsed time since the real data 702 has been stored. The time counted by the elapsed time calculator 607 is used in determination of whether the real data 702 is to be deleted. If the time counted by the elapsed time calculator 607 exceeds a predetermined time, the controller 602 deletes the real data 702.

Figure 7:
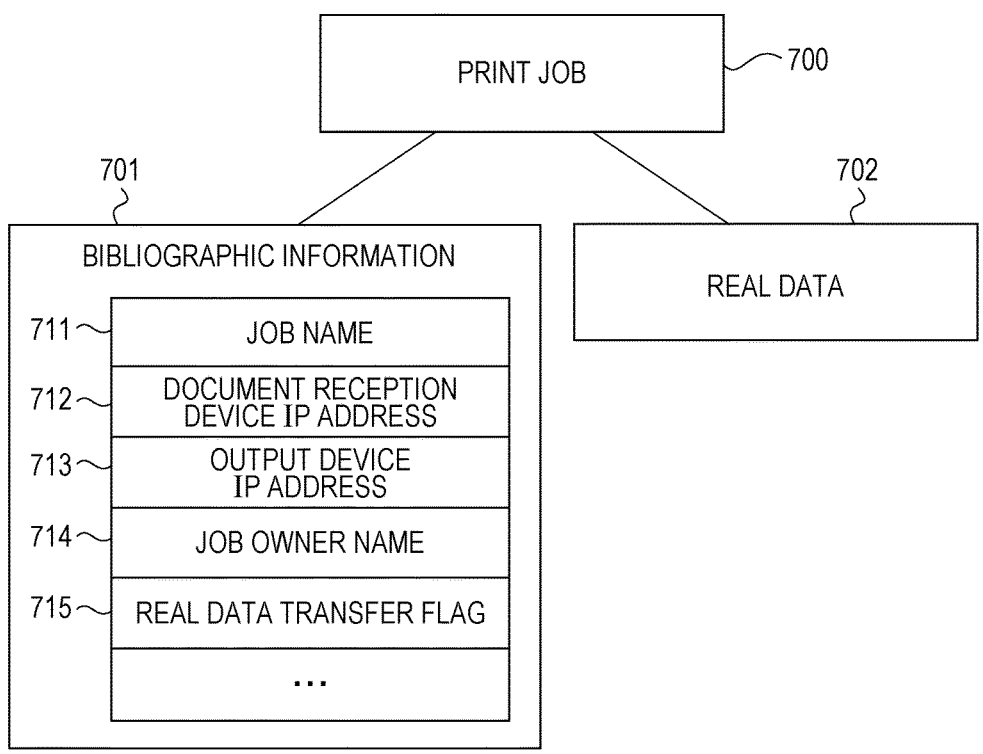
FIG. 7 illustrates an exemplary structure of a print job.

A structure of the print job 700 will now be described. FIG. 7 illustrates an exemplary structure of the print job 700. Upon input of the print job 700 from the information processing apparatus 101, the bibliographic information generator 604 in the document reception device 103 generates the bibliographic information 701 from basic information about the print job 700. The bibliographic information 701 includes information about, for example, the job name 711, the document reception device IP address 712, the output device IP address 713, and a job owner name 714. The basic information, such as the job name 711 and the job owner name 714, is generated at the side of the printer driver 501 when the basic information is input from the information processing apparatus 101. The document reception device IP address 712 is generated by adding an Internet protocol (IP) address of the document reception device 103 by the controller 602 in the document reception device 103 in the input of the print job. The output device IP address 713 is generated by adding an IP address of the output device 104 by the controller 602 in the output device 104 in the output of the print job. The real data 702 means PDL data. A real data transfer flag 715 is added in the server device 102 when the transfer of the real data 702 to the server device 102 is completed in the input of the print job.

A job history will now be described. FIG. 8 illustrates an exemplary job history. The job history table 800 includes columns for storing job name information, document reception device IP address information, output device IP address information, job owner name information, and other setting information. First job history information 801, second job history information 802, and third job history information 803 are stored in the job history table 800 as multiple pieces of job history information. In the job history table 800, the document reception device IP address information and the output device IP address information are managed for each print job. The document reception device IP address information and the output device IP address information are used for determination of whether the document reception device IP address information coincides with the output device IP address information.

For example, in the first job history information 801 and the third job history information 803, the values of the document reception device IP address 712 are different from the values of the output device IP address 713. This indicates that these print jobs are subjected to the remote print. Specifically, the job history table 800 indicates that print jobs "MeetingMaterial.doc" and "Quatation.doc" of Smith (user) are printed with a device different from the document reception device 103. The print jobs of a device different from the document reception device 103 are managed using the remote print record list in the above manner. FIG. 9 illustrates an example of the remote print record list. As described above, the job name of the print job determined to be subjected to the remote print by the job history determiner 606 is stored in the remote print record list 1000. "MeetingMaterial.doc" and "Sample.pdf" are stored in the remote print record list 1000 in the first embodiment.

Figure 10:
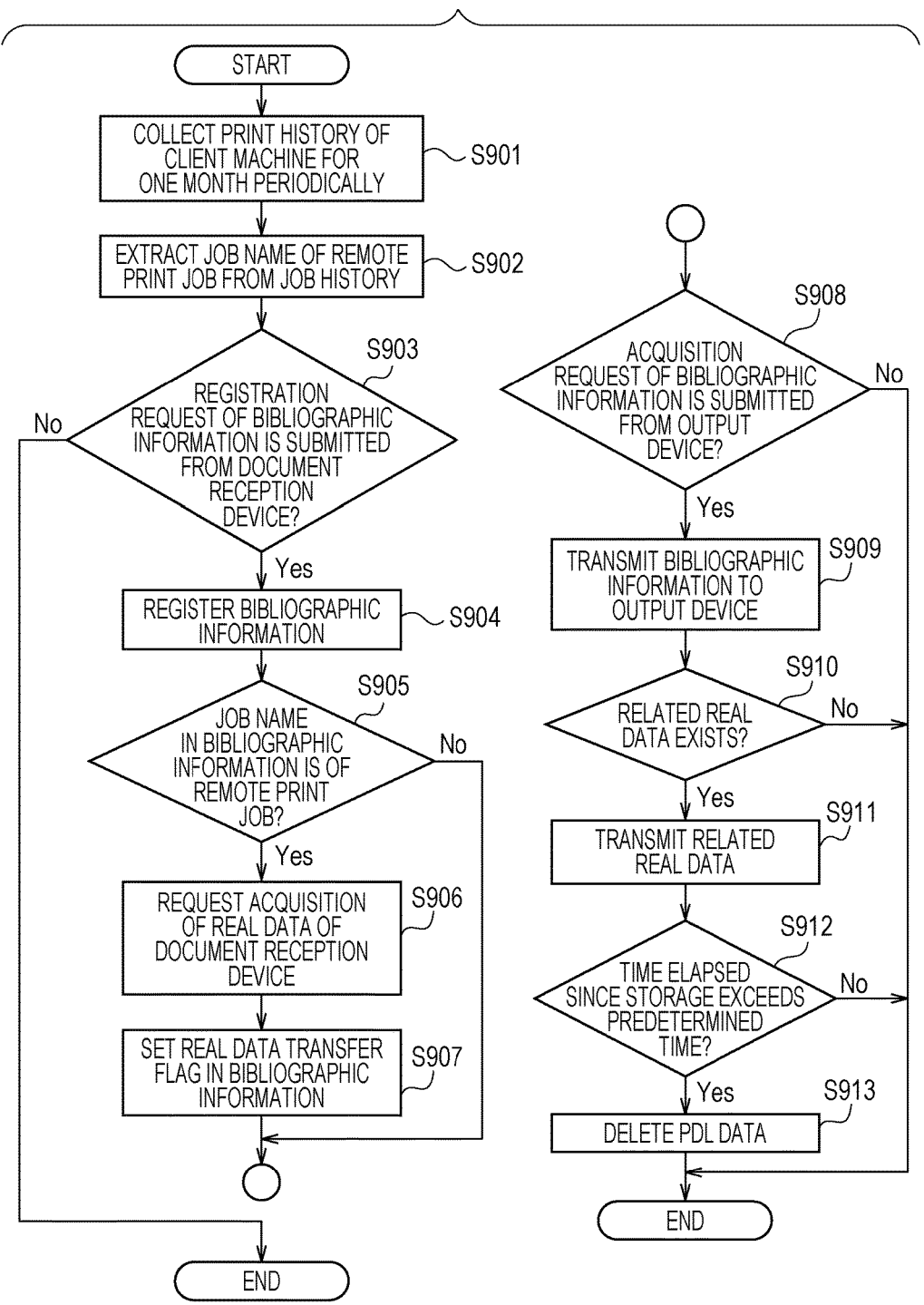
FIG. 10 is a flowchart illustrating an example of information processing in a server device in a first embodiment.

Information processing in the server device 102 will now be described. FIG. 10 is a flowchart illustrating an example of the information processing in the server device 102. The process in the flowchart in FIG. 10 is realized by the CPU 301 in the server device 102, which executes a program stored in the auxiliary storage unit 303.

Referring to FIG. 10, in a document reception process, in Step S901, the server device 102 collects the job history table 800 in advance from the client machines (the document reception device 103 and the output device 104). The server device 102 in the first embodiment periodically performs the collection every month.

In Step S902, the job history determiner 606 checks the document reception device IP address 712 and the output device IP address 713 of the print job collected in the job history table 800. If the document reception device IP address 712 is different from the output device IP address 713, the job history determiner 606 determines that the print job has been subjected to the remote print. The job history determiner 606 extracts the corresponding job name 711 in the job history table 800 and stores the extracted job name 711 in the remote print record list 1000.

In Step S903, the server device 102 determines whether the request for registration of the bibliographic information 701 is submitted from the document reception device 103. This request for registration is transmitted from the document reception device 103 when the print job 700 transmitted from the information processing apparatus 101 is stored in the document reception device 103. In the document reception device 103, the bibliographic information is generated from the acquired print job 700 with the bibliographic information generator 604.

Then, the server device 102 accepts communication from the document reception device 103. If the content of communication is not the request for registration of the bibliographic information (NO in Step S903), it is determined that another process is performed and the process illustrated in FIG. 10 is terminated. If the content of communication is the request for registration of the bibliographic information (YES in Step S903), the process goes to Step S904.

In Step S904, the print job storage 601 stores the bibliographic information 701 in the hold printing area 401. In Step S905, the job history determiner 606 determines whether the job name 711 in the registered bibliographic information 701 is included in the remote print record list 1000. If the job history determiner 606 determines that the job name 711 in the registered bibliographic information 701 is included in the remote print record list 1000 (YES in Step S905), the process goes to Step S906. If the job history determiner 606 determines that the job name 711 in the registered bibliographic information 701 is not included in the remote print record list 1000 (NO in Step S905), the process goes to Step S908. Step S905 is an exemplary step of determining whether transmission of the real data is requested from the document reception device 103. Another method may be used to determine whether transmission of the real data is requested.

In Step S906, the server device 102 submits the request for acquisition of the real data 702 to the document reception device 103. In Step S907, the server device 102 sets (stores) the real data transfer flag 715 in the bibliographic information 701 at a time when the real data 702 is stored. At the same time, the elapsed time calculator 607 starts the counting of the elapsed time.

The document reception process of the print job in the server device 102 is completed in the above manner.

An output process of the print job in the server device 102 will now be described. After the document reception process, the server device 102 accepts communication from the output device 104. In Step S908, the server device 102 determines whether the content of communication from the output device 104 is the request for acquisition of the bibliographic information. If the server device 102 determines that the content of communication is not the request for acquisition of the bibliographic information (NO in Step S908), it is determined that another process is performed and the process illustrated in FIG. 10 is terminated. If the server device 102 determines that the content of communication is the request for acquisition of the bibliographic information (YES in Step S908), the process goes to Step S909.

In Step S909, the communicator 603 in the server device 102 transmits the bibliographic information 701 to the output device 104. The bibliographic information 701 includes the document reception device IP address and the real data transfer flag 715. Accordingly, the output device 104 submits the request for acquisition of the PDL data to the server device 102 if the real data transfer flag 715 is included and submits the request for acquisition of the PDL data to the document reception device 103 if the real data transfer flag 715 is not included.

In Step S910, the controller 602 in the server device 102 determines whether the real data transfer flag 715 is included in the bibliographic information 701. Then, the controller 602 in the server device 102 prepares for the request for acquisition of the real data from the output device 104. Upon reception of the request for acquisition of the real data from the output device 104, the controller 602 in the server device 102 determines whether the real data 702 is capable of being transferred. If the controller 602 determines that the real data 702 is capable of being transferred (YES in Step S910), the process goes to Step S911. If the controller 602 determines that the real data 702 is not capable of being transferred (NO in Step S910), the process illustrated in FIG. 10 is terminated.

In Step S911, the controller 602 transmits the real data 702 to the output device 104 via the communicator 603. Then, the process goes to Step S912.

In Step S912, the controller 602 determines whether the time counted by the elapsed time calculator 607 exceeds a predetermined time. If the controller 602 determines that the time counted by the elapsed time calculator 607 exceeds a predetermined time (YES in Step S912), the process goes to Step S913. If the controller 602 determines that the time counted by the elapsed time calculator 607 does not exceed a predetermined time (NO in Step S912), the process illustrated in FIG. 10 is terminated.

In Step S913, the controller 602 deletes the real data 702 in the server device 102.

In the server device 102, it is possible to, for example, change the time set for the deletion of the real data. The information set for the deletion of the real data is stored in, for example, the auxiliary storage unit 303. Such setting information is input with a setting operation by the user with the display unit 304 or the input unit 305.

According to the first embodiment, the server device 102 extracts the job name 711 subjected to the remote print from the print job history and, when the print job 700 of the job name is input, receives both the real data and the bibliographic information for registration. The server device 102 transmits the bibliographic information and the real data to the output device 104 in response to a request from the output device 104. With such a printing system, when the remote print is to be performed in the output device 104, the PDL data is capable of being acquired from the server device 102. Accordingly, it is possible to reliably acquire the PDL data even if the document reception device 103 is turned off. In addition, even when the document reception device 103 is in a power saving mode, it is not necessary to activate the document reception device 103 each time the remote print is performed. Accordingly, it is possible to reduce the power consumption in the remote print.

Although the document reception device 103 determines whether the real data is to be transmitted based on the result of the determination in the server device 102 in the first embodiment, another method may be used to determine whether the real data is to be transmitted.

For example, the real data may be transmitted to the server device 102 if the power saving mode is set in the document reception device 103 and the real data may not be transmitted to the server device 102 if the power saving mode is not set in the document reception device 103.

Although the remote print record is managed for each print job in the first embodiment, the remote print record may be managed for each user. For example, a method may be used in which the user (Smith) who has performed the remote print is registered as the user having an experience of the remote print and the user (Brown) who has not performed the remote print is not registered as the user having an experience of the remote print. The real data may be transmitted to the server device 102 if the print job is transmitted from the user (Smith) who has performed the remote print and the real data may not be transmitted to the server device 102 if the print job is transmitted from the user (Brown) who has not performed the remote print.

Second Embodiment

In the first embodiment, the job name of the job subjected to the remote print is extracted to determine whether the request for acquisition of the real data is to be submitted.

Figure 11:
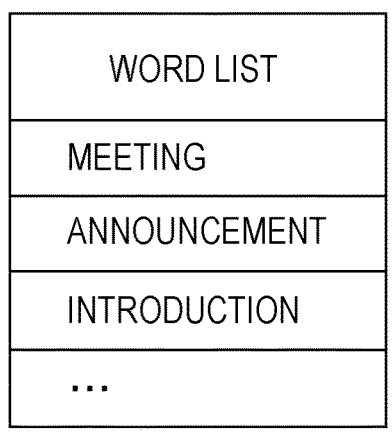
FIG. 11 illustrates an exemplary word list.

In a second embodiment, whether the request for acquisition of the real data is to be submitted is determined using the job name of the received job. FIG. 11 illustrates an exemplary word list having a high possibility for the remote print, which has been registered by a manager in advance. The word list illustrated in FIG. 11 is stored in, for example, the auxiliary storage unit 303 in the server device 102. The CPU 301 is capable of editing a word list 1200 in FIG. 11 in response to an editing operation by the manager with the input unit 305 or the like. The word list 1200 is an exemplary method of managing word information.

Figure 12:
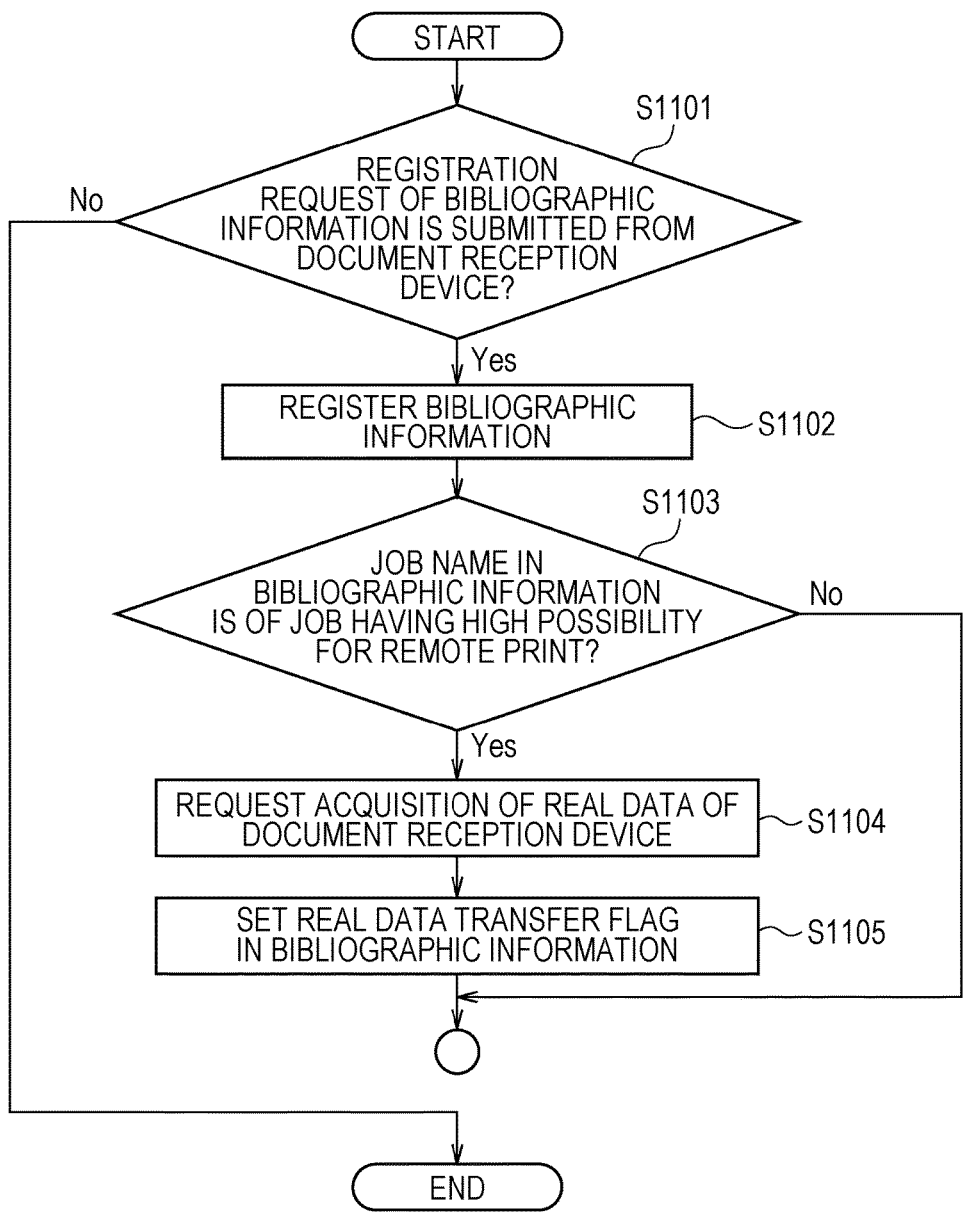
FIG. 12 is a flowchart illustrating an example of information processing in a server device in a second embodiment.

FIG. 12 is a flowchart illustrating exemplary information processing in the server device 102 in the second embodiment. The process in the flowchart in FIG. 12 is realized by the CPU 301 in the server device 102, which executes a program stored in the auxiliary storage unit 303.

When the print job 700 from the information processing apparatus 101 has been stored in the document reception device 103, the bibliographic information generator 604 in the document reception device 103 generates the bibliographic information 701 from the print job 700 and submits a request for registration of the bibliographic information 701 to the server device 102 via the communicator 603. Referring to FIG. 12, in Step S1101, the server device 102 determines whether the request for registration of the bibliographic information 701 is received from the document reception device 103. For example, if the server device 102 determines that the request for registration of the bibliographic information 701 is received, for example, within a predetermined time (YES in Step S1101), the process goes to Step S1102. If the server device 102 determines that the request for registration of the bibliographic information 701 is not received within a predetermined time (NO in Step S1101), the process illustrated in FIG. 12 is terminated. In Step S1102, the print job storage 601 registers the biblio-graphic information 701 in the hold printing area 401. In Step S1103, the job history determiner 606 determines whether the job name 711 in the registered bibliographic information 701 is included in the word list 1200 registered by the manager in advance. If the job history determiner 606 determines that the job name 711 in the registered bibliographic information 701 is included in the word list 1200 (YES in Step S1103), the process goes to Step S1104. If the job history determiner 606 determines that the job name 711 in the registered bibliographic information 701 is not included in the word list 1200 (NO in Step S1103), the process goes to Step S908 in FIG. 10. Step S1103 is an exemplary step of determining whether the bibliographic information is related to the remote print based on the bibliographic information received from the document reception device 103. In Step S1104, the server device 102 submits the request for acquisition of the real data 702 to the document reception device 103. In Step S1105, the server device 102 sets the real data transfer flag 715 in the bibliographic information 701 at a time when the real data 702 is stored. At the same time, the elapsed time calculator 607 starts the counting of the elapsed time. Since the steps subsequent to Step S1105 are the same as Steps S908 to S913 in FIG. 10, a description of the steps subsequent to Step S1105 is omitted herein.

According to the second embodiment, the server device 102 is capable of determining whether the real data is to be acquired only by identifying the job name 711 of the print job 700.

Although the word list 1200 is managed in the server device 102 in the second embodiment, the word list 1200 may be managed in the document reception device 103. In other words, the document reception device 103 may determine alone whether the real data is to be transmitted in the input of the job.

Although whether the real data is to be transmitted is determined using the job name of the received job in the second embodiment, whether the real data is to be transmitted may be determined using other information about the received job.

For example, it may be determined that the real data is to be transmitted if the print setting set in the print job indicates a high possibility for the remote print and it may be determined that the real data is not to be transmitted if the print setting set in the print job indicates a low possibility (no possibility) for the remote print.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-091511 filed Apr. 28, 2016, which is hereby incorporated by reference herein in its entirety.

What is claimed is:

1. An image forming system comprising:
a first information processing apparatus;
a second information processing apparatus; and
an image forming apparatus,
wherein the first information processing apparatus acquires page description language data from an external apparatus, generates identification information for the acquired page description language data, transmits the generated identification information to the second information processing apparatus, transmits the page description language data to the second information processing apparatus if the second information processing apparatus determines that the page description language data is to be transmitted to the second information processing apparatus, and transmits the page description language data to the image forming apparatus in accordance with a request from the image forming apparatus without transmitting the page description language data to the second information processing apparatus,
wherein the second information processing apparatus acquires the identification information from the first information processing apparatus, transmits the identification information to the image forming apparatus, and transmits the page description language data to the image forming apparatus in response to a request from the image forming apparatus if the second information processing apparatus determines that the page description language data has been acquired from the first information processing apparatus, and
wherein the image forming apparatus acquires the identification information from the second information processing apparatus, acquires the page description language data from the first information processing apparatus if the image forming apparatus determines that the page description language data is to be acquired from the first information processing apparatus and forms an image based on the page description language data, and acquires the page description language data from the second information processing apparatus if the image forming apparatus determines that the page description language data is to be acquired from the second information processing apparatus and forms an image based on the page description language data.

2. The image forming system according to claim 1, wherein the second information processing apparatus determines that the page description language data is to be transmitted to the second information processing apparatus based on a request from the second information processing apparatus.

3. The image forming system according to claim 2, wherein the second information processing apparatus determines whether a request for the page description language data is to be transmitted to the first information processing apparatus based on the acquired identification information.

4. The image forming system according to claim 2, wherein the second information processing apparatus determines whether a request for the page description language data is to be transmitted to the first information processing apparatus based on name information of a print job added to the identification information.

5. The image forming system according to claim 1, wherein the image forming apparatus determines that the page description language data is to be acquired from the second information processing apparatus based on information indicating that the second information processing apparatus includes the page description language data, and determines that the page description language data is to be acquired from the first information processing apparatus based on information indicating that the second information processing apparatus does not include the page description language data and information indicating that the first information processing apparatus includes the page description language data.

6. The image forming system according to claim 5, wherein the second information processing apparatus transmits the information indicating that the second information processing apparatus includes the page description language data to the image forming apparatus if the second information processing apparatus determines that the page description language data has been acquired from the first information processing apparatus, and
wherein the second information processing apparatus transmits the information indicating that the second information processing apparatus does not include the page description language data and the information indicating that the first information processing apparatus includes the page description language data to the image forming apparatus if the second information processing apparatus determines that the page description language has not been acquired from the first information processing apparatus.

7. The image forming system according to claim 1, wherein the first information processing apparatus determines whether the page description language data is to be transmitted to the second information processing apparatus based on name information of a print job added to the page description language data.

8. The image forming system according to claim 1, wherein the first information processing apparatus includes an image forming unit and causes the image forming unit to form an image based on the page description language data.

9. A method of using an image forming system including a first information processing apparatus, a second information processing apparatus, and an image forming apparatus, the method comprising:

causing the first information processing apparatus to acquire page description language data from an external apparatus;

causing the first information processing apparatus to generate identification information for the acquired page description language data;

causing the first information processing apparatus to transmit the generated identification information to the second information processing apparatus;

causing the first information processing apparatus to transmit the page description language data to the second information processing apparatus if the first information processing apparatus determines that the page description language data is to be transmitted to the second information processing apparatus;

causing the first information processing apparatus to transmit the page description language data to the image forming apparatus in response to a request from the image forming apparatus without transmitting the page description language data to the second information processing apparatus;

causing the second information processing apparatus to acquire the identification information from the first information processing apparatus;

causing the second information processing apparatus to transmit the identification information to the image forming apparatus;

causing the second information processing apparatus to transmit the page description language data to the image forming apparatus in response to a request from the image forming apparatus if the second information processing apparatus determines that the page description language data has been acquired from the first information processing apparatus;

causing the image forming apparatus to acquire the identification information from the second information processing apparatus;

causing the image forming apparatus to acquire the page description language data from the first information processing apparatus if the image forming apparatus determines that the page description language data is to be acquired from the first information processing apparatus and form an image based on the page description language data; and causing the image forming apparatus to acquire the page description language data from the second information processing apparatus if the image forming apparatus determines that the page description language data is to be acquired from the second information processing apparatus and form an image based on the page description language data, wherein the second information processing apparatus determines that the page description language data is to be transmitted to the second information processing apparatus based on a request from the second information processing apparatus.

10. The method according to claim 9, wherein the image forming apparatus determines that the page description language data is to be acquired from the second information processing apparatus based on information indicating that the second information processing apparatus includes the page description language data, and determines that the page description language data is to be acquired from the first information processing apparatus based on information indicating that the second information processing apparatus does not include the page description language data and information indicating that the first information processing apparatus includes the page description language data.

11. The method according to claim 9, wherein the first information processing apparatus determines whether the page description language data is to be transmitted to the second information processing apparatus based on name information of a print job added to the page description language data.

12. A non-transitory recording medium storing a method of controlling an image forming system including a first information processing apparatus, a second information processing apparatus, and an image forming apparatus, the method comprising:

causing the first information processing apparatus to acquire page description language data from an external apparatus;

causing the first information processing apparatus to generate identification information for the acquired page description language data;

causing the first information processing apparatus to transmit the generated identification information to the second information processing apparatus;

causing the first information processing apparatus to transmit the page description language data to the second information processing apparatus if the first information processing apparatus determines that the page description language data is to be transmitted to the second information processing apparatus;

causing the first information processing apparatus to transmit the page description language data to the image forming apparatus in response to a request from the image forming apparatus without transmitting the page description language data to the second information processing apparatus;

causing the second information processing apparatus to acquire the identification information from the first information processing apparatus;

causing the second information processing apparatus to transmit the identification information to the image forming apparatus;

causing the second information processing apparatus to transmit the page description language data to the image forming apparatus in response to a request from the image forming apparatus if the second information processing apparatus determines that the page description language data has been acquired from the first information processing apparatus;

causing the image forming apparatus to acquire the identification information from the second information processing apparatus;

causing the image forming apparatus to acquire the page description language data from the first information processing apparatus if the image forming apparatus determines that the page description language data is to be acquired from the first information processing apparatus and form an image based on the page description language data; and causing the image forming apparatus to acquire the page description language data from the second information processing apparatus if the image forming apparatus determines that the page description language data is to be acquired from the second information processing apparatus and form an image based on the page description language data, wherein the second information processing apparatus determines that the page description language data is to be transmitted to the second information processing apparatus based on a request from the second information processing apparatus.

13. The non-transitory recording medium according to claim 12, wherein the image forming apparatus determines that the page description language data is to be acquired from the second information processing apparatus based on information indicating that the second information processing apparatus includes the page description language data, and determines that the page description language data is to be acquired from the first information processing apparatus based on information indicating that the second information processing apparatus does not include the page description language data and information indicating that the first information processing apparatus includes the page description language data.

\* \* \* \* \*